May 7, 1968  D. WALKER  3,381,580
APPARATUS FOR CUTTING BARS AND TUBES
Filed May 31, 1966  3 Sheets-Sheet 1
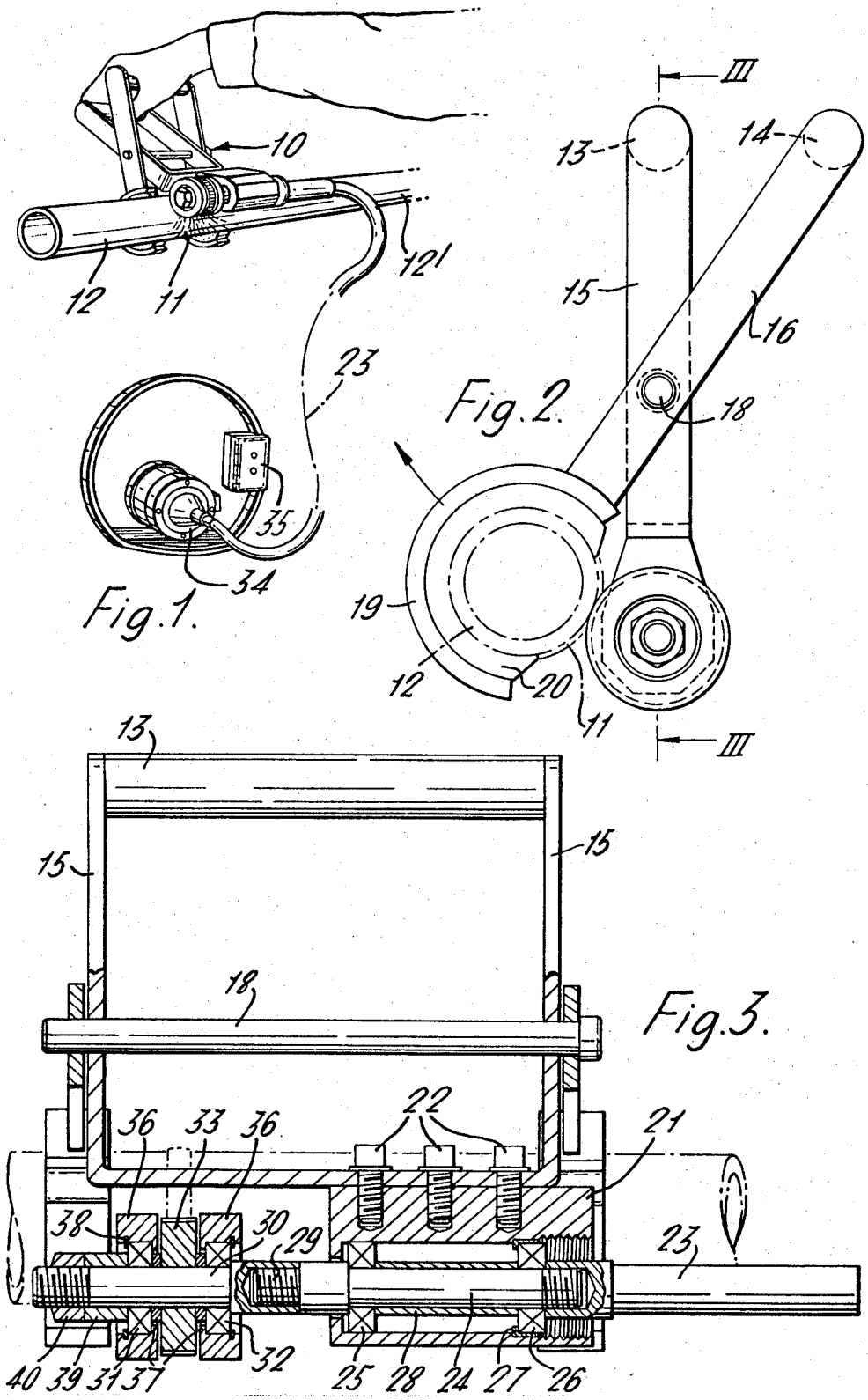

May 7, 1968     D. WALKER     3,381,580

APPARATUS FOR CUTTING BARS AND TUBES

Filed May 31, 1966     3 Sheets-Sheet 2

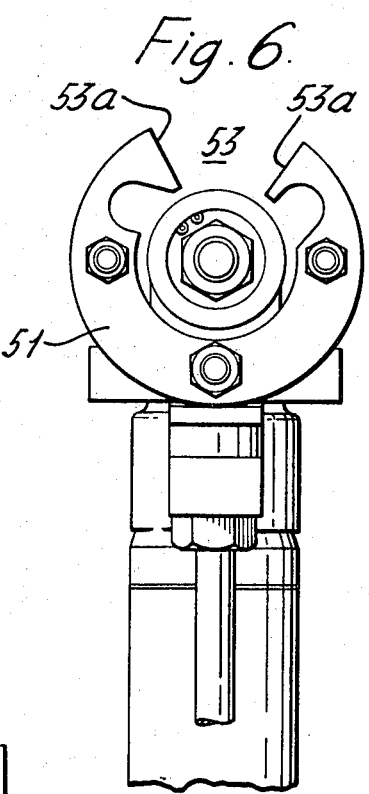
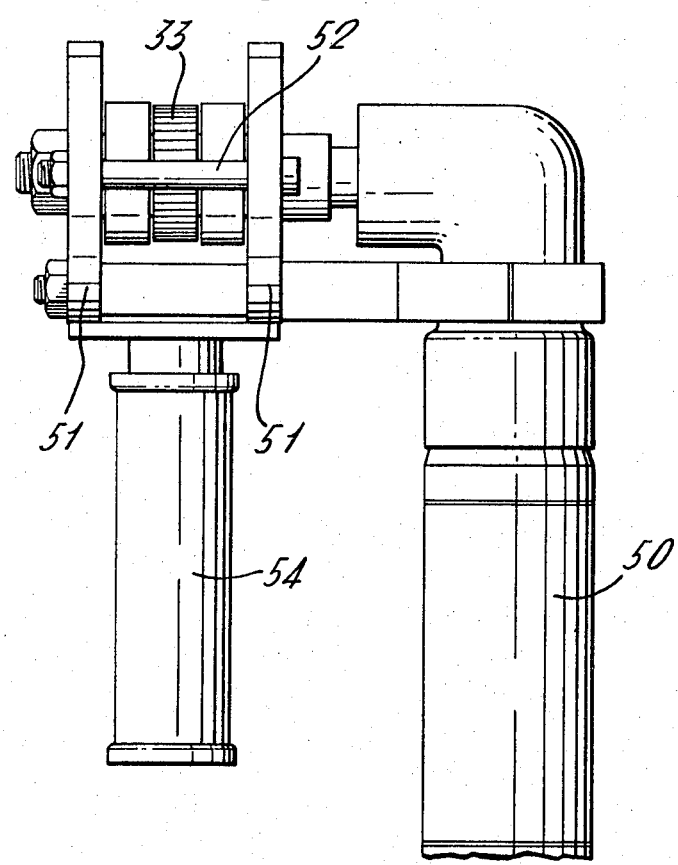

United States Patent Office 3,381,580
Patented May 7, 1968

3,381,580
APPARATUS FOR CUTTING BARS AND TUBES
Derek Walker, Four Gates, Hopstone, Claverley,
near Wolverhampton, Staffordshire, England
Filed May 31, 1966, Ser. No. 554,050
Claims priority, application Great Britain, June 4, 1965,
23,830/65
12 Claims. (Cl. 90—12)

ABSTRACT OF THE DISCLOSURE

Apparatus for removing the surface irregularities, such as excess welding, from bars or tubes or other workpieces of elongated form comprising a rotary milling cutter and guide means which when the apparatus is in use abuts the bar or tube and maintains the axis about which the cutter rotates parallel with the axis of the bar or tube at least when the cutter is in a cutting position and which guides the cutter as it is moved around the bar or tube, the arrangement permitting ready application of the apparatus to a workpiece without elaborate "setting up" operations and yet will limit the cutter to removal of only a predetermined amount of material.

---

This invention is concerned with apparatus for cutting bars or tubes.

According to this invention there is provided apparatus for cutting bars or tubes comprising a rotatable cutting tool and guide means which when the apparatus is in use abut the bar or tube and maintain the axis about which the cutting tool rotates parallel with the axis of the bar or tube at least when the tool is in a cutting position and which guide the tool as it is moved around the bar or tube.

The apparatus of the present invention finds its main application in the trimming of excess weld material from bars of tubes but it will be apparent from the following description that it may readily be used for rebating or grooving a workpiece. Certain embodiments of the invention to be described and illustrated herein may be applied to the milling of hexagonal, square or other section tubes or bars as well as to circular section tubes or bars.

When the apparatus is used for trimming excess weld from tubes or bars I prefer to provide means which abut the tube or bar or a part fixed relatively to the tube or bar to limit the cut made by the tool so that not less than a predetermed amount of the weld material remains. This limit would be such that prevents the bar or tube from being parted off and could be such that ensures that the area of the weld would be flush with the remainder of the surface of the bar or tube or could be such as to leave a small amount of the weld standing proud from the surface of the bar or tube.

If it is required to form a groove or rebate I conveniently arrange that the depth of the groove or rebate be limited by the abutment means.

Embodiments of this invention are illustrated in the accompanying drawings in which:

FIGURE 1 is a perspective view of one embodiment in use,

FIGURE 2 is a side view of the embodiment shown in FIGURE 1,

FIGURE 3 is a part sectional view on the line III—III of FIGURE 2,

FIGURE 6 is a side view of a fourth embodiment in use and

FIGURE 7 is a front view of the embodiment in FIGURE 6.

In the drawings like parts are referred to by like reference numerals.

Figure 4:
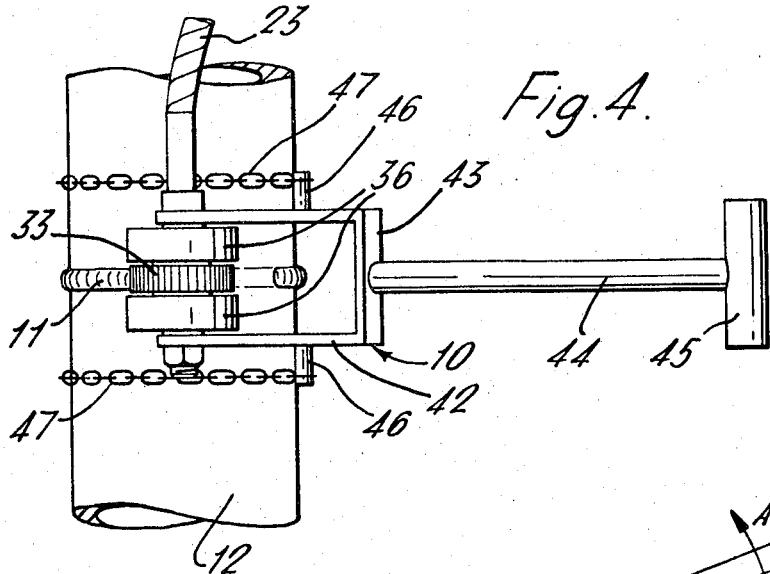
FIGURE 4 is a plan view of a second embodiment in use.

The apparatus generally indicated at 10 in FIGURE 1 is shown in use to remove excess weld material from a weld 11 which butt-joints the tubes 12 and $12^1$.

The device comprises handles 13 and 14 which are mounted on a pair of levers 15 and a pair of levers 16 respectively. The two pairs of levers are pivoted about a pivot rod 18 to have a scissor-type movement and the end of each lever 16 remote from the handle 14 carries a part circular section holder 19 within which a jaw 20 for abutting engagement with the tube 12 is located. The jaws are removable from the holder so that they may be replaced by jaws for use with different diameter tubes.

The pairs of levers 15 are constituted by a U-shaped strap, the free ends of which are interconnected by the handle 13 and on the base of the U a housing 21 is secured by three screws 22 which pass through the base of the U and engage in threaded holes in the housing.

The housing accommodates a connector shaft 24 by which a flexible drive element 23 is connected to the spindle 30 of a cutting tool 33. The drive element is driven from a motor 34 which is controlled from a control panel 35.

The connector shaft 24 is mounted in bearings 25 and 26 of which bearing 26 is secured against axial movement relatively to the shaft by a ring 27 and a collar on the flexible drive element and which the bearing 25 is prevented from axial movement by a collar on the shaft 24 and a sleeve 28 embracing the shaft and extending between the bearings 25 and 26.

The connector arrangement is assembled in the housing through an enlarged axial opening in the end of the opening remote from the tool spindle and that opening is screw-threaded so that it may be closed by a correspondingly threaded cap member which has an opening through which the drive element 23 passes.

A connection of the connector shaft to the tool spindle 30 is made by threaded engagement of those two parts as indicated at 29 and the rotatable, fluted milling tool 33 is keyed to the spindle and the spindle is rotatable in bearings 31 and 32 to the outer side of each of which is secured a wheel 36.

The bearings 31, 32 are secured against axial movement on the spindle 30 by a shoulder on the spindle at that axial end thereof nearest to the connection 29 and by a collar 39 which is held in position by a nut 40 located on the screw-threaded end of spindle 30 remote from the shoulder.

The wheels 36 comprising the gauging means are secured to the bearings by circlips 38 and by annular radial flanges 37.

The wheels 36 are illustrated as being of slightly greater diameter than the cutting tool so that the wheels abut the tube 12 and prevent the tool from being advanced too far towards the tube axis and so prevent less than a required amount of the weld material from remaining on the tube after the trimming operation is completed. Where it is required that the area of the weld be flush with the remainder of the tube then the wheels will be of similar diameter to that of the cutter and where it is required to groove the tube then the wheels could be of smaller diameter than the cutter or could be omitted.

As is particularly illustrated in FIGURE 1 the device is located with the concave inner surface of the jaw engaging the tube and the handles brought together so that the tool is brought into contact with the weld. The whole assembly is then manually rotated, if access is possible, through 360° parallel to the axis of the tube or, through that angle through which the device can be turned and then removed from the tube and represented to the tube so that the cutting tool and jaws are on opposite sides of the tube to those sides in which they are illustrated in FIGURE 1 and the turning operation repeated.

Figure 5:
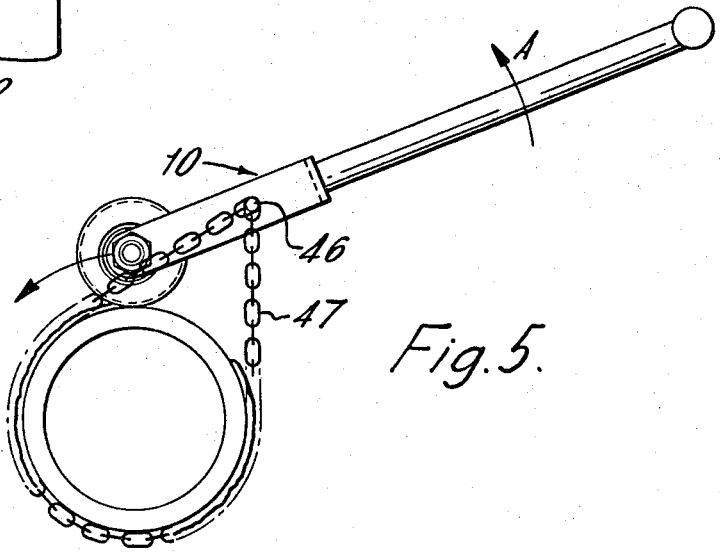
FIGURE 5 is a side view of the embodiment of FIGURE 4.

The embodiment illustrated in FIGURES 4 and 5 comprises a similar tool 33 and adjacent wheels 36 to those illustrated in FIGURES 1 to 3 and the tool is driven through a flexible drive element 23 from a motor which is not illustrated.

The tool and wheels are mounted between the free ends of a U-shaped bracket 42 to the base 43 of which is connected a handle 44 which terminates in a grip 45.

Two pegs 46 are secured one to each limb of the U-shaped bracket and two chains 47, one to each peg, are attached to the pegs so that the chains form closed loops which embrace a tube from which excess weld material is to be removed. The length of the chain forming the loop can be adjusted to accommodate different sizes of tube by selecting appropriate links of the chain to be engaged on the pegs.

It will be appreciated that, considering FIGURE 5, movement of the handle in the direction of the arrow A will cause the milling tool to be brought into contact with the weld and that tension will be exerted in the chain and that the tool can then be rotated about the axis of the tube whilst the tension is maintained in the chain.

In the embodiment of FIGURES 6 and 7 drive is applied to the tool by an air motor 50 and through a pair of bevel gears in the housing of the motor.

A pair of jaws 51 are connected by ties 52 one jaw to each side of the cutting tool and the jaws each have an aligned V-shaped notch 53 the edges 53a of which support a tube located in that notch with the tube axis and the tool spindle axis parallel with each other.

A handle 54 is connected to the device to assist in rotating the device about the section.

It will readily be appreciated that the embodiment illustrated in FIGURES 6 and 7 could be modified by the replacement of the air motor by any motor and one particular modification which is considered to be useful is the use of the electric motor of a pistol grip drill. The drive from the drill motor to the tool would be through a bevel gear system in substantially similar fashion to the manner described above. The cutting apparatus could be sold as an attachment for a drill.

Whilst in the embodiments illustrated the tool is shown as being of cylindrical form however it could be of frusto-conical form to be used to form a chamfer or of any form to obtain a desired cut.

I claim:

1. Apparatus for removing surface irregularities from workpieces of elongated form, comprising a support, a cutter rotatably mounted on the support, drive means operative to rotate said cutter, gauging wheel means freely rotatable on the support and co-axial with and adjacent to the cutter to limit the depth of cut by the cutter, and guide means connected to said support and having guide surfaces operative in use to contact the outer surface of the workpiece at positions spaced along its length and at least to assist in maintaining the axis of the cutter and gauging wheel means parallel with the length of the workpiece while the cutter is moved around the workpiece.

2. Apparatus as claimed in claim 1 wherein the guide means comprises at least two flexible elements each flexible element having a loop portion operative to encircle the workpiece and presenting a guide surface, the loop portions being of equal length, and two ends of each loop portion being connected to said support and at least one end being spaced from the axis of the cutter and gauging means.

3. Apparatus as claimed in claim 2 wherein the ends of one of said loop portions are on one side of the planes through the cutter and normal to the axis of rotation of the cutter and the ends of the other of said loop portions are on the other side of said planes.

4. Apparatus according to claim 3 in which the support comprises a body portion and two spaced arm portions, and in which the cutter is disposed between said arm portions and the end of one of said loop portions are connected to one of said arms and the ends of the other of said loop portions are connected to the other of said arms.

5. Apparatus according to claim 1 in which the gauging wheel means comprises two gauging wheels freely rotatable on the support and co-axial with and adjacent to the cutter, the cutter being disposed between the two gauging wheels.

6. Apparatus according to claim 1 in which the gauging wheel means is of greater diameter than the cutter.

7. Apparatus according to claim 1 wherein the support comprises a pair of levers pivotally connected to each other for scissor-like movement, one of said levers carrying the cutter and the other of said levers carrying the guide means.

8. Apparatus according to claim 7 wherein the guide surfaces are part-circular.

9. Apparatus according to claim 8 in which guide surfaces are disposed on opposite sides of the planes through the cutter and normal to the axis of rotation of the cutter.

10. Apparatus according to claim 1 wherein the guide surfaces are fixed relatively to the cutter axis and are constructed and arranged so that they guide the tool as it is rotated against the outer face of the workpiece.

11. Apparatus according to claim 10 in which the guide surfaces define a mouth for receiving the workpiece, which mouth becomes progressively narrower as it is entered, the cutter being disposed at the narrower end of the mouth.

12. Apparatus according to claim 1 in which a handle means is connected to the support to enable the apparatus to be manipulated relatively to the workpiece.

References Cited

UNITED STATES PATENTS

| 1,932,462 | 10/1933 | Howlett | 30—97 |
| 2,291,395 | 7/1942 | Levey | 30—97 |
| 2,983,043 | 5/1961 | Petersen | 30—95 |
| 3,131,599 | 5/1964 | Macfarlane et al. | 90—12 |

FOREIGN PATENTS

| 898,999 | 7/1944 | France. |

LEONIDAS VLACHOS, *Primary Examiner.*